US010867354B1

(12) United States Patent
Slusar et al.

(10) Patent No.: US 10,867,354 B1
(45) Date of Patent: Dec. 15, 2020

(54) RISK BEHAVIOR DETECTION METHODS BASED ON TRACKING HANDSET MOVEMENT WITHIN A MOVING VEHICLE

(71) Applicant: Allstate Insurance Company, Northbrook, IL (US)

(72) Inventors: Mark V. Slusar, Chicago, IL (US); Joseph Kleinhenz, Bollingbrook, IL (US); Eric D. Huls, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 614 days.

(21) Appl. No.: 15/614,262

(22) Filed: Jun. 5, 2017

Related U.S. Application Data

(60) Continuation of application No. 14/277,940, filed on May 15, 2014, now Pat. No. 9,672,568, which is a division of application No. 13/802,193, filed on Mar. 13, 2013, now Pat. No. 9,846,912, which is a continuation-in-part of application No. 13/802,088, (Continued)

(51) Int. Cl.

| | |
|---|---|
| G06Q 40/08 | (2012.01) |
| G08G 1/16 | (2006.01) |
| H04W 4/02 | (2018.01) |
| G07C 5/00 | (2006.01) |
| G01S 19/13 | (2010.01) |
| G01S 13/00 | (2006.01) |
| G08G 1/01 | (2006.01) |
| G08G 1/017 | (2006.01) |
| G08G 1/00 | (2006.01) |

(Continued)

(52) U.S. Cl.
CPC .......... *G06Q 40/08* (2013.01); *G01S 5/02* (2013.01); *G01S 13/00* (2013.01); *G01S 19/13* (2013.01); *G07C 5/008* (2013.01); *G08G 1/017* (2013.01); *G08G 1/0112* (2013.01); *G08G 1/0129* (2013.01); *G08G 1/163* (2013.01); *H04W 4/027* (2013.01); *H04W 4/40* (2018.02)

(58) Field of Classification Search
None
See application file for complete search history.

(56) References Cited

U.S. PATENT DOCUMENTS

| | | |
|---|---|---|
| 5,895,436 A | 4/1999 | Savoie et al. |
| 5,969,595 A | 10/1999 | Schipper et al. |

(Continued)

FOREIGN PATENT DOCUMENTS

| | | |
|---|---|---|
| EP | 0304089 A2 | 2/1989 |
| EP | 1229343 A1 | 8/2002 |

(Continued)

OTHER PUBLICATIONS

Development and Evaluation of a Cellular Phone Based Teen Driver Support System, Final Report, Written by Janet Creaser et al., HumanFIRST Program and Dept. of Mechanical Engineering, University of Minnesota, Report dated Aug. 2009, 101 pages.

(Continued)

*Primary Examiner* — Jason Borlinghaus
(74) *Attorney, Agent, or Firm* — Banner & Witcoff, Ltd.

(57) ABSTRACT

At least a method for determining risk behavior of a driver is described. While a vehicle is being driven, data is obtained related to the position and movement of a wireless communications device. The data may indicate the type of behavior exhibited by the driver while the vehicle is being driven.

20 Claims, 4 Drawing Sheets

Related U.S. Application Data filed on Mar. 13, 2013, now Pat. No. 9,086,948, and a continuation of application No. 13/802,252, filed on Mar. 13, 2013, now abandoned.

(51) Int. Cl.
*G01S 5/02* (2010.01)
*H04W 4/40* (2018.01)

(56) References Cited

U.S. PATENT DOCUMENTS

| | | | |
|---|---|---|---|
| 6,225,897 B1 | 5/2001 | Doyle et al. |
| 6,738,697 B2 | 5/2004 | Breed |
| 7,286,857 B1 | 10/2007 | Walker et al. |
| 7,382,274 B1 | 6/2008 | Kermani et al. |
| 7,474,264 B2 | 1/2009 | Bolduc et al. |
| 7,489,240 B2 | 2/2009 | Soliman |
| 7,646,312 B2 | 1/2010 | Rosen |
| 7,788,063 B2 | 8/2010 | Bodin et al. |
| 7,876,205 B2 | 1/2011 | Catten et al. |
| 7,933,547 B2 | 4/2011 | Brown et al. |
| 8,019,391 B2 | 9/2011 | Suzuki |
| 8,060,150 B2 | 11/2011 | Mendenhall et al. |
| 8,090,598 B2 | 1/2012 | Bauer et al. |
| 8,140,358 B1 | 3/2012 | Ling et al. |
| 8,180,655 B1 | 5/2012 | Hopkins, III |
| 8,295,454 B2 | 10/2012 | Ron et al. |
| 8,384,555 B2 | 2/2013 | Rosen |
| 8,489,433 B2 | 7/2013 | Altieri et al. |
| 8,520,695 B1 | 8/2013 | Rubin et al. |
| 8,577,352 B1 | 11/2013 | Breiner |
| 8,718,536 B2 | 5/2014 | Hannon |
| 8,787,949 B2 | 7/2014 | Sumcad et al. |
| 8,799,032 B2 | 8/2014 | Fernandes et al. |
| 9,165,470 B2 | 10/2015 | Mudalige et al. |
| 2002/0101365 A1 | 8/2002 | Flick |
| 2002/0121132 A1 | 9/2002 | Breed et al. |
| 2003/0009270 A1 | 1/2003 | Breed |
| 2003/0187704 A1 | 10/2003 | Hashiguchi et al. |
| 2004/0022214 A1 | 2/2004 | Goren et al. |
| 2004/0102985 A1 | 5/2004 | Wahlbin et al. |
| 2004/0153362 A1 | 8/2004 | Bauer et al. |
| 2005/0003844 A1 | 1/2005 | Nishiga et al. |
| 2005/0134440 A1 | 6/2005 | Breed |
| 2006/0149461 A1 | 7/2006 | Rowley et al. |
| 2006/0180371 A1 | 8/2006 | Breed et al. |
| 2007/0008129 A1 | 1/2007 | Soliman |
| 2007/0118411 A1 | 5/2007 | Conner et al. |
| 2007/0152803 A1 | 7/2007 | Huang et al. |
| 2007/0229234 A1 | 10/2007 | Smith |
| 2008/0247566 A1 | 10/2008 | Mao et al. |
| 2008/0262670 A1 | 10/2008 | McClellan et al. |
| 2008/0268767 A1 | 10/2008 | Brown et al. |
| 2008/0268769 A1 | 10/2008 | Brown et al. |
| 2008/0294302 A1 | 11/2008 | Basir |
| 2008/0319602 A1 | 12/2008 | McClellan et al. |
| 2009/0005979 A1 | 1/2009 | Nakao et al. |
| 2009/0085728 A1 | 4/2009 | Catten et al. |
| 2009/0201149 A1 | 8/2009 | Kaji |
| 2009/0215387 A1 | 8/2009 | Brennan et al. |
| 2009/0253423 A1 | 10/2009 | Kullberg |
| 2009/0262604 A1 | 10/2009 | Funada |
| 2010/0035632 A1 | 2/2010 | Catten |
| 2010/0131304 A1 | 5/2010 | Collopy et al. |
| 2010/0138242 A1 | 6/2010 | Ferrick et al. |
| 2010/0234047 A1 | 9/2010 | Lipovski et al. |
| 2010/0293090 A1 | 11/2010 | Domenikos et al. |
| 2010/0302371 A1 | 12/2010 | Abrams |
| 2010/0323657 A1 | 12/2010 | Barnard et al. |
| 2011/0021234 A1 | 1/2011 | Tibbitts et al. |
| 2011/0053506 A1 | 3/2011 | Lemke et al. |
| 2011/0076996 A1 | 3/2011 | Burton et al. |
| 2011/0136468 A1 | 6/2011 | McNamara et al. |
| 2011/0177786 A1 | 7/2011 | Marano et al. |
| 2011/0190972 A1 | 8/2011 | Timmons et al. |
| 2011/0300843 A1 | 12/2011 | Miller et al. |
| 2012/0004933 A1 | 1/2012 | Foladare et al. |
| 2012/0006611 A1 | 1/2012 | Wallace et al. |
| 2012/0013457 A1 | 1/2012 | Dowling |
| 2012/0034876 A1 | 2/2012 | Nakamura et al. |
| 2012/0071151 A1 | 3/2012 | Abramson et al. |
| 2012/0072243 A1 | 3/2012 | Collins et al. |
| 2012/0100827 A1 | 4/2012 | Bolin |
| 2012/0123806 A1* | 5/2012 | Schumann, Jr. ....... G06Q 40/08 705/4 |
| 2012/0196544 A1 | 8/2012 | Bolingbroke |
| 2012/0244883 A1 | 9/2012 | Tibbitts et al. |
| 2012/0303392 A1 | 11/2012 | Depura et al. |
| 2012/0329520 A1 | 12/2012 | Akama |
| 2013/0006674 A1 | 1/2013 | Bowne et al. |
| 2013/0030606 A1 | 1/2013 | Mudalige et al. |
| 2013/0046562 A1 | 2/2013 | Taylor et al. |
| 2013/0084847 A1 | 4/2013 | Tibbitts et al. |
| 2013/0102324 A1 | 4/2013 | Qiu et al. |
| 2013/0218583 A1 | 8/2013 | Marcolongo et al. |
| 2013/0265153 A1 | 10/2013 | Taylor et al. |
| 2013/0317862 A1 | 11/2013 | Fernandes et al. |
| 2014/0019167 A1 | 1/2014 | Cheng et al. |
| 2014/0046701 A1 | 2/2014 | Steinberg et al. |
| 2014/0132210 A1 | 5/2014 | Partovi |
| 2014/0149145 A1 | 5/2014 | Peng et al. |
| 2014/0172467 A1 | 6/2014 | He et al. |
| 2014/0185518 A1 | 7/2014 | Ramakrishnan et al. |
| 2014/0330594 A1 | 11/2014 | Roberts et al. |
| 2014/0334684 A1 | 11/2014 | Strimling |
| 2015/0371215 A1 | 12/2015 | Zhou et al. |

FOREIGN PATENT DOCUMENTS

| | | |
|---|---|---|
| EP | 2099203 A1 | 9/2009 |
| EP | 2264988 A1 | 12/2010 |
| EP | 2541474 A1 | 1/2013 |
| KR | 20010107832 A | 12/2001 |
| KR | 20070088315 A | 8/2007 |
| WO | 03017208 A2 | 2/2003 |
| WO | 2013105869 A1 | 7/2013 |

OTHER PUBLICATIONS

Ironclad GPC Tracking, Mobile Phone Tracking, Use and Benefits of Mobile Phone Trackers, www.ironcladgps.co.nz/mobile-phone-trackers-htm, dated May 9, 2013, 2 pages.

User State Tracking Using Smartphones, by Mehmet Sönercan et al., Submitted to the Department of Computer Engineering, Bo?azici University, Jun. 2011, 23 pages.

Mobile Phones as Traffic Probes: Practices, Prospects and Issues, Geoff Rose, Transport Reviews, vol. 26, No. 3, 275-291, May 2006, 18 pages.

In-Vehicle Driver Detection Using Mobile Phone Sensors, Hon Lung Chu, Duke ECE, Apr. 20, 2011, 21 pages.

Mobile Phone Location Determination and Its Impact on Intelligent Transportation Systems, Yilin Zhao, IEEE Transactions on Intelligent Transportation Systems, vol. 1, No. 1, Mar. 2000, 10 pages. http://ieeexplore.ieee.org/xpl/login.jsp?tp=&arnumber=4086533&url= http%3A%2F%2Fieeexplore.ieee.org%2Fxpls%2Fabs_all.jsp% 3Farnumber%3D4086533, downloaded Jul. 18, 2013, 2 pages.

Google Book search, http://books.google.co.in/books?hl=en&lr= &id=iwuE3nNGn-UC&oi=fnd&pg=PP1&dq=intra+vehicle+ communication&ots=9s1po9tTOq&sig=dHyCNEB6k4LP8919rjhW_ 6fbjMo, downloaded Jun. 10, 2013.

Yang, J., et al., Detecting Driver Phone Use Leveraging Car Speakers, Sep. 19-23, 2011, pp. 1-12.

Chu, H., et al., Poster: You Driving? Talk to You Later, Jun. 28-Jul. 1, 2011, 1 page.

Jul. 28, 2014—(US) Non-Final Office Action—U.S. Appl. No. 13/802,252.

Sep. 10, 2014—(US) Office Action—U.S. Appl. No. 13/802,193.

Sep. 29, 2014—(US) Office Action—U.S. Appl. No. 13/802,088.

Apr. 28, 2015—(US) Office Action—U.S. Appl. No. 13/802,252.

Nov. 24, 2015—(US) Final Office Action—U.S. Appl. No. 13/802,193.

(56) References Cited

OTHER PUBLICATIONS

Apr. 7, 2016—(US) Non-Final Office Action—U.S. Appl. No. 14/277,940.
Sep. 9, 2016—(US) Non-Final Office Action—U.S. Appl. No. 13/802,193.
Sep. 29, 2016—(US) Non-Final Office Action—U.S. Appl. No. 14/803,446.
Nov. 30, 2016—(US) Final Rejection—U.S. Appl. No. 14/277,940.
Feb. 27, 2017—(US) Notice of Allowance—U.S. Appl. No. 14/803,446.
Mar. 22, 2017—(US) Notice of Allowance—U.S. Appl. No. 14/277,940.
Zeng, et al., Hazardous Driving Prediction System, The Connected Vehicle Technology Challenge, Texas A&M University, 2011, (20 pages).
Dec. 28, 2017—(US) Non-Final Office Action—U.S. Appl. No. 15/614,202.
Aug. 11, 2017—(US) Notice of Allowance—U.S. Appl. No. 13/802,193.
A Meta-Analysis of the Effects of Cell Phones on Driver Performance, Caird et al., 2008, Accidental Analysis and Prevention, 40 pages, 1282-1293.
The Effect of Cellular Phone Use on Driving Performance, Ishida et al., 2001, IATSS Research, vol. 25, No. 2, pp. 6-14.
Jul. 8, 2020—(US) Non-Final Office Action—U.S. Appl. No. 16/151,997.

* cited by examiner

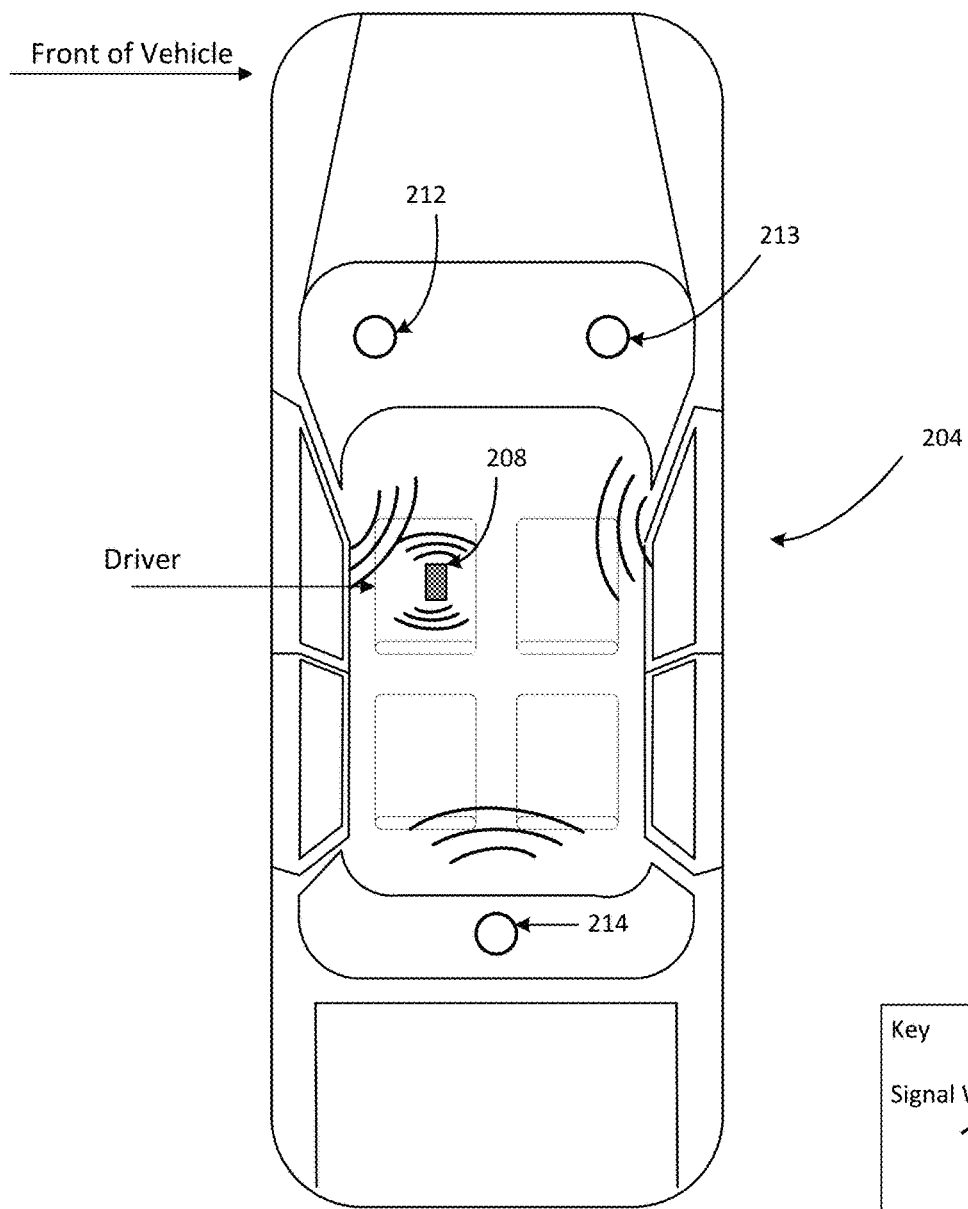
FIGURE 2
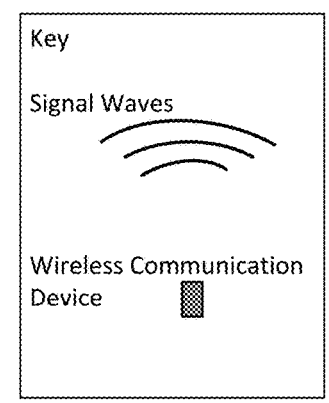

RISK BEHAVIOR DETECTION METHODS BASED ON TRACKING HANDSET MOVEMENT WITHIN A MOVING VEHICLE

CROSS-REFERENCE TO RELATED-APPLICATIONS

This application claims priority to and is a continuation of U.S. application Ser. No. 14/277,940, filed on May 15, 2014 which is a divisional application of U.S. application Ser. No. 13/802,193, filed on Mar. 13, 2013, which is both a continuation-in-part of U.S. application Ser. No. 13/802,088, filed on Mar. 13, 2013, and a continuation of U.S. application Ser. No. 13/802,252, filed on Mar. 13, 2013. All of the aforementioned applications are hereby incorporated by reference in their entirety herein.

TECHNICAL FIELD

Aspects of this disclosure relate to monitoring the movement and/or position of a handset or mobile communication device within a vehicle. More specifically, aspects of the disclosure relate to monitoring or tracking the movement of a mobile communications device while a vehicle is being driven to determine risk behavior of the driver of the vehicle.

BACKGROUND

Telematics devices are used by insurance companies to monitor driving behavior for the purpose of setting insurance premiums based on an analysis of the monitored data. These devices transmit various types of information to a data analysis server, including information such as the time of day in which a vehicle is most frequently operated, the mileage reading of the vehicle, the number of times the vehicle is driven over a predetermined threshold (e.g., 80 mph, etc.), and instances of hard braking and quick acceleration, among other things.

Telematics programs by insurance companies may offer participants the opportunity to reduce the cost of their insurance premium based on their driving behavior. While information such as the time of day and mileage reading may be helpful, additional information may be valuable to an insurance company when determining the cost of the insurance premium.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the exemplary embodiments provide at least a method for determining a risk associated with a vehicle being driven by a driver based on data received by a computer based system. The data may comprise information that identifies movement and a position of a mobile communications device used by a driver of the vehicle over unit time. The data may further comprise telematics data such as speed, acceleration, deceleration, times of operation, duration of operation, mileage driven per day, and day of the week the vehicle is used.

The various aspects of the exemplary embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

The present invention is illustrated by way of example and is not limited in the accompanying figures in which like reference numerals indicate similar elements and in which:

FIG. 2 is a diagram of an exemplary operating environment in accordance with aspects of the disclosure.

It will be apparent to one skilled in the art after review of the entirety disclosed that the steps illustrated in one or more of the figures of the present disclosure may be performed in other than the recited order, and that one or more steps illustrated in these figures may be optional.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

Figure 1:
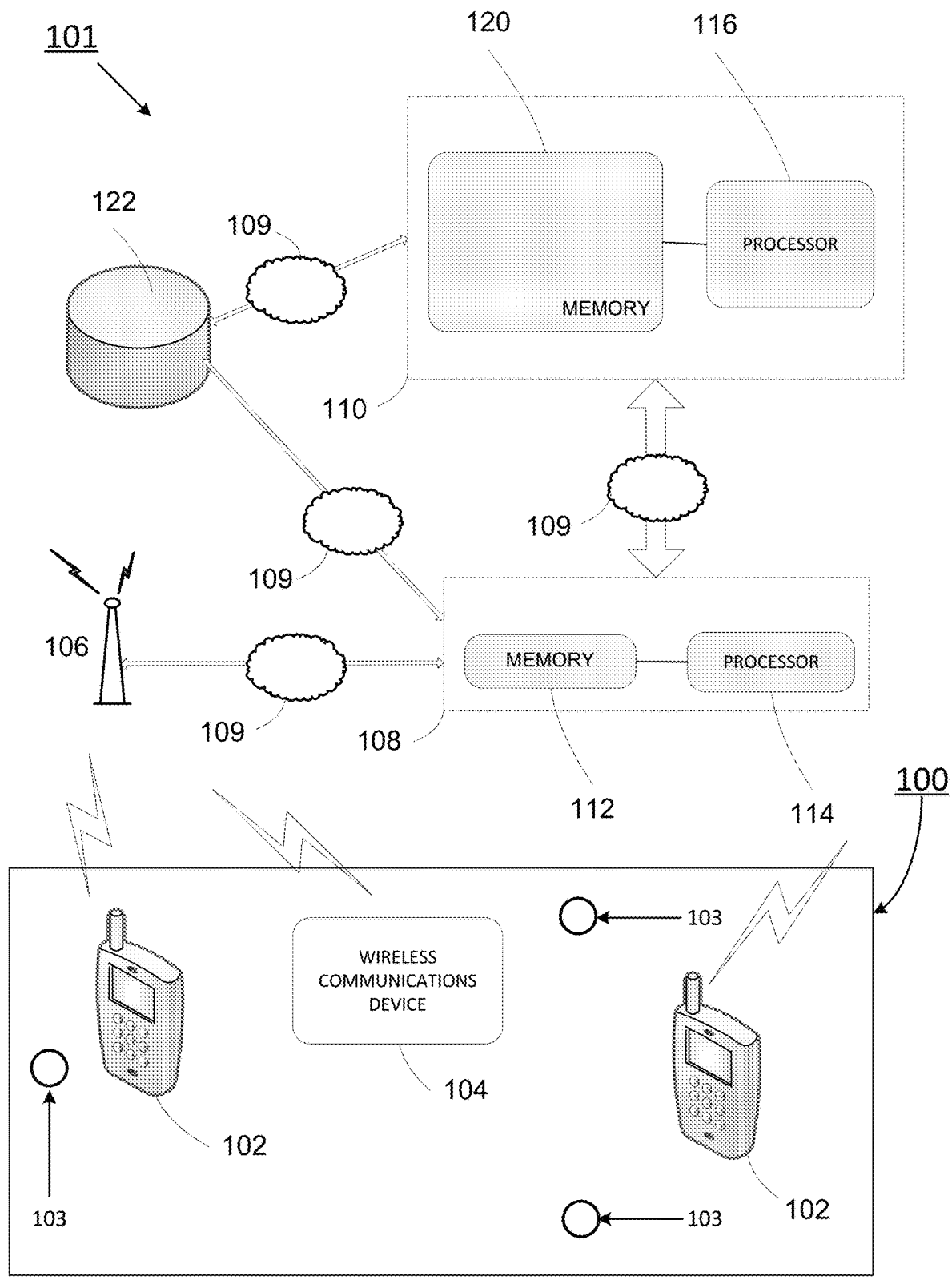
FIG. 1 depicts an illustrative operating environment in accordance with aspects of the disclosure.

FIG. 1 depicts an illustrative operating environment in accordance with aspects of the disclosure. The operating environment comprises a vehicle 100 and telecommunications/computing system 101. The vehicle 100 comprises one or more communications devices 102, 104 and one or more localization devices 103. The localization devices may be appropriately attached to the interior surface of the vehicle to allow for unobstructed wireless communication between the one or more communications devices 102, 104 and the one or more localization devices 103. Telematics data may be wirelessly transmitted from the one or more communications devices 102, 104 and/or the one or more localization devices 103. The telematics data may provide information pertaining to the location, movement, and behavior of the vehicle being driven. Each of the one or more localization devices 103 may comprise an RFID node, a Bluetooth Low Energy (BLE) locater, or any other type of receiver, transmitter, or transceiver. Each of the one or more localization devices 103 may comprise a processor and memory.

A user of wireless communication devices 102, 104 may communicate with a wireless access point 106. The wireless access point 106 may comprise a cell site or cellular tower, for example. The wireless communication device 102 may comprise a mobile telephone with applications and other functionality (e.g., APPLE® iPhone, RESEARCH IN MOTION® Blackberry, Windows® mobile device, a mobile device using an Android based operating system, or other mobile telephone). The mobile telephone may be configured with an enhanced roadside assistance application installed, or other portable electronic device. The wireless communication device 104 may comprise a handheld mobile communications device with Wi-Fi connectivity (e.g., APPLE® iPad, Android tablet, Kindle, or the Samsung Galaxy, etc.). The wireless communication devices 102, 104 may be configured to communicate with the a wireless access point 106 such as a cellular tower operated which may be owned and operated by a cellular service provider. Alternatively, the wireless access point 106 may be a Wi-Fi (i.e., compatible with IEEE 802.11a/b/g/n etc. wireless communication standards) hotspot where each of the wireless communication devices 102, 104 may obtain access to the Internet (e.g., to communicate using online chat applications or voice-over-IP applications).

Vehicular telematics data may be wirelessly transmitted from the one or more communications devices 102, 104 and/or the one or more localization devices 103. The telematics data may provide information pertaining to the location, movement, and behavior of the vehicle being driven. The vehicular telematics data may be transmitted to one or more servers 108, 110 by way of the cell tower 106. The telematics data may be transmitted from the cell tower 106 to the one or more servers 108, 110 by way of using one or more a wide area network (WANs), metropolitan area networks (MANs), and/or local area networks (LANs) 109

Each of the servers 108, 110 (e.g., a computer) may include a memory 112, 120 storing computer-readable instructions and a processor 114, 116 for executing the computer-readable instructions to perform method steps in accordance with aspects of the disclosure. The data may be communicated to the servers 108, 110 from the wireless communication devices 102, 104 by way of transmission over the WANs, MANs, and LANs 109 by way of using the wireless access point 106. The memories 112, 120 may also store data that may be useful to applications running on the mobile devices 102, 104 or the servers 108, 110. For example, the computer data files may provide position information describing the locations of one or more mobile communication devices 102, 104 over time relative to one or more localization devices. The position information of driver's mobile communication device over time may be used to provide a measure of risk associated with a driver of a vehicle. The data collected and stored in memory 112, 120 may be used to support one or more of the numerous features disclosed throughout this disclosure. Other data stored in the memory 112, 120 may include data that identifies the one or more wireless communication devices used in the vehicles, identifies one or more owners of the one or more wireless communication devices, identifies the one or more vehicles they are currently driving, and provides vehicular performance and handling data such as speed, acceleration, and braking information, mileage per trip, and time of day the one or more vehicles are driven, among other things. The data may be transmitted by the one or more mobile communication devices 102, 104 and/or localization devices 103. The data may be received by the servers 108, 110 and stored into memory 112, 120. Additional data may comprise any type of telematics or sensor data capable of being transmitted to the servers 108, 110 by way of the mobile communication devices and/or localization devices in the one or more vehicles.

One skilled in the art will appreciate that each of the servers 108, 110 is not limited to a single computer, a single computer based system, single machine, or device. The server may be embodied as a web server or Internet-accessible server. Furthermore, the term server refers to any system of computers and/or devices (e.g., firewalls, routers, caching systems, proxy servers, networked computers, or combination thereof) that may be used to provide access to services and features available for use. As such, reference to a server performing particular steps does not require that the same machine/device perform all the steps.

Servers 108, 110, data storage device 122, and wireless access point 106 may communicate over wired and/or wireless connections. In some instances, a private, secure connection may be established between one or more of these components. For example, servers 108, 110 may communicate by way of a network cloud representing the Internet. Alternatively, servers 108, 110 and the data storage device 122 may communicate over a secure WAN or a dedicated T1 (or other telecommunications) line. The data storage device 122 may store any data used by the processors 114, 116 and memories 112, 120.

Each of the wireless communication devices 102, 104 may include a processor, memory, Bluetooth and Wi-Fi transceivers and corresponding antennae, RFID and/or other electromagnetic transceivers and corresponding antennae, display screen (e.g., touchscreen), keypad, sensors (e.g., motion, optical, etc.), camera, global positioning system (GPS) chip, audio output/input devices, and other electronic components configured for use in mobile phones, PDAs, tablets, and mini-laptops.

In one embodiment, each of the one or more communication devices 102, 104 may also comprise an optical sensor which may be used to determine the location or position of each of the one or more communications devices relative to optical signals emitted by the localization devices 103. Each of the one or more communication devices 102, 104 may reflect the received optical signal back to the localization devices 103. The movement of each of the one or more communication devices 102, 104 may be monitored and tracked based on the movement of the reflected signal from each of the one or more communication devices 102, 104. By way of using radio frequency and/or optical signals, the location of each of the one or more communication devices may be tracked over time.

In another example, one or more servers 108, 110 may include a processor, RAM, ROM, communications module, and/or memory storing an operating system, applications, and/or data. Each of the one or more servers may have a processor for controlling overall operation of the server and its associated components, including random access memory, read-only memory, communications module, and memory. Such a server may include a variety of computer readable media. Computer readable media may be any available media, both tangible and intangible, that may be accessed by the server and include both volatile and non-volatile media, and removable and non-removable media. By way of example, and not limitation, computer readable media may comprise a combination of computer storage media and communication media. Computer storage media include volatile and nonvolatile, removable and non-removable media implemented in any method or technology for storage of information such as computer readable instructions, object code, data structures, program modules or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by each of the servers 108, 110.

The aforementioned one or more servers 108, 110 may store one or more applications for using the application data stored in RAM memory while the server is on and corresponding software applications (e.g., software tasks) are running on the server. The one or more servers 108, 110 may include hardware, software, and network components. Execution of the software by the hardware may cause the one or more servers 108, 110 to perform one or more algorithms. The one or more algorithms may be used to determine a risk behavior of a driver of a vehicle. The risk behavior may be based on position data associated with movement of a handheld communication device. In an exemplary embodiment, the one or more servers 108, 110 may comprise a risk assessment module that automatically executes the computation of the risk behavior of the driver based position or location data of the one or more communication devices 102, 104. The risk assessment module at the server 108, 110 may process the received data to determine the risk behavior of the driver. The localization devices 103 and one or more servers 108, 110 described in connection with FIG. 1 may be described as a "driver behavior risk assessment system." Thus, by way of using radio frequency and/or optical signals, the location of each of the one or more communication devices may be tracked over time.

The movement of the handheld communication device provides an indication of the risk behavior of the driver. Typical vehicular telematics data may provide information concerning the behavior of the vehicle itself. Vehicular telematics data may be supplemented by using the driver behavior risk assessment system. Thus, the behavior of the driver as well as the behavior of the vehicle may be tracked and monitored by an insurance company or other entity/person.

The aforementioned communications module may include a microphone, keypad, touch screen, and/or stylus through which a user of the server may provide input, and may also include one or more of a speaker for providing audio output and a video display device for providing textual, audio/visual and/or graphical output. Software may be stored within the memory and/or storage to provide instructions to the processor for enabling the risk assessment module of the server to perform various functions. For example, memory may store software used by the risk assessment module of the server, such as an operating system, application programs, and/or an associated database. Alternatively, some or all of the computer executable instructions used by the one or more servers 108, 110 may be embodied in hardware or firmware. Moreover, the data storage device 122 may provide centralized storage of data. The one or more servers 108, 110 may operate in a networked environment supporting connections to one or more remote computing devices. The remote computing devices may be personal computing devices or servers that include many or all of the elements described above relative to the server. Remote computing devices may be a mobile device communicating over wireless carrier channel. The network connections depicted in the figures may include a local area network (LAN) 109 and/or a wide area network (WAN) 109, but may also include other networks. When used in a LAN networking environment, the server may be connected to the LAN 109 through a network interface or adapter in the communications module. When used in a WAN networking environment, the server may include a modem in the communications module or other means for establishing communications over the WAN 109, such as the Internet. It will be appreciated that the network connections shown and described are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various commonly known web browsers can be used to display and manipulate data on web pages.

FIG. 2 is a diagram of an exemplary operating environment in accordance with an embodiment of the disclosure. The diagram illustrates the use of a wireless communication device 208 such as a mobile phone handset being operated by a driver of a vehicle 204. The driver may hold the mobile phone while driving. The driver may hold the phone close to his mouth while speaking. The driver may hold the mobile phone with one or two hands while texting or text messaging someone. The driver may hold the phone in one or more positions depending on how he wishes to use the phone while driving. The wireless communication device 208 may communicate with a wireless access point such as a cell tower as was previously shown in connection with FIG. 1. The vehicle 204 may comprise an automobile, truck, mini-van, bus, sport utility vehicle (SUV), recreational vehicle, boat, airplane, train, motorcycle, or any other type of vehicle.

The wireless communication device 208 may communicate with one or more localization devices 212, 213, 214 that are placed within the vehicle. The localization devices 212, 213, 214 may correspond to the localization devices 103 previously described in connection with FIG. 1. For example, the one or more localization devices 212, 213, 214 may be positioned symmetrically within the vehicle. The localization devices 212, 213, 214 may be placed, for example, at the sides of the front windshield and midline on the rear windshield as shown in FIG. 2. Alternatively, the localization devices 212, 213, 214 may be placed or positioned at various other locations within the vehicle. While the localization devices 212, 213, 214 may be positioned symmetrically within the vehicle, it is contemplated that the localization devices 212, 213, 214 may be placed asymmetrically within the car.

Aspects of the invention utilize the one or more localization devices 212, 213, 214 to determine the location of the wireless communication device 208 within the vehicle. Use of a single localization device (212 or 213 or 214) may provide location information of the mobile communication device 208 in a single dimension. Use of two localization devices (e.g., 213, 214) may provide location information of the mobile communication device in a two dimensional plane. Use of three localization devices 212, 213, 214 may provide location information of the mobile communication device in three dimensional space. The localization devices 212, 213, 214 may utilize a wireless personal area network (WPAN) to communicate with the wireless communication device 208. In a representative embodiment, the strength of a signal that is received by the wireless communication device 208 may be used to determine the distance between the wireless communication device 208 and each of the localization devices 212, 213, 214. The signal may comprise a radio frequency, electromagnetic, optical, visual light spectrum or audio signal, for example. The frequency components of the signal may be associated with any frequency. One or more of the localization devices 212, 213, 214 may transmit one or more signals or beacons to the wireless communication device 208, for example. Each of the signals may be received by the wireless communication device 208. The location of the wireless communication device 208 may be determined from measurements of the amplitude and phase of the received signals, for example. Given the fixed locations of the localization devices 212, 213, 214, the amplitude and phase of each of the three received signals may be used to triangulate and determine the location of the wireless communication device 208 within the vehicle 204. Of course the use of additional localization devices, such as a fourth localization device, may be used to improve triangulation accuracy when determining the location of the wireless communication device 208. In an example, audio spectrum signals such as voices in a vehicle, ambient noises within a vehicle (wind, road noise or other ambient noises) or sounds from a radio can provide the signals used in determining the location of the wireless communication device.

The localization devices 212, 213, 214 may communicate with the wireless communication device 208 using Wi-Fi (IEEE 802.11a/b/g/n), Bluetooth, NFC (Near Field Communication), GSM, UMTS, and/or BLE (Bluetooth Low Energy) technologies. The localization devices 212, 213, 214 may transmit one or more signals using the one or more technologies. The one or more signals may be received by a receiver resident in the wireless communication device 208. In one embodiment, the transmission times of one or more received signals may be measured by the wireless communication device 208 to determine one or more distances between one or more localization devices 212, 213, 214 to the wireless communication device 208. The distances from the localization devices may be used to determine the location of the communication device 208.

In one embodiment, the localization devices 212, 213, 214 may be used to reflect a signal transmitted by the wireless communication device 208. The wireless communication device may be able to compute its distance from the localization device based on the time it takes the signal to be reflected back to the wireless communication device 208. The localization devices 212, 213, 214 may comprise a reflective material (e.g., reflective paint, reflective sticker, etc.) to allow the signal to be reflected back to the wireless communication device 208. The reflective material may comprise special properties (e.g., nano-properties) that absorb and/or reflect radio waves in a non-standard manner. In some aspects, the reflective material, instead of absorbing the signal, may reflect or amplify certain or all frequencies associated with the signal. The wireless communication device 208 may comprise an antenna array for measuring the angle in which the reflected signals is received. At least one benefit of using reflective materials in some embodiments may be a reduced/non-existent requirement for a power source to operate the localization devices.

In one embodiment, the various aspects of the invention may employ the use of a combination of communication technologies. For example, the wireless communication device 208 may employ both Wi-Fi and Bluetooth technologies. The wireless communication device 208 may comprise a Wi-Fi transceiver and a Bluetooth transceiver. The Wi-Fi transceiver may be located at an optimal distance, such as far apart from the Bluetooth transceiver as possible, to minimize interference. For example, the Wi-Fi transceiver may be positioned on the top portion of the wireless communication device 208 while the Bluetooth transceiver may be positioned on the bottom portion of the wireless communication device 208.

In one embodiment, each of the localization devices 212, 213, 214 comprises a BLE transceiver. The BLE transceiver may comprise a switched antenna array. BLE packets may be transmitted at regular intervals by the one or more localization devices 212, 213, 214. The wireless communication device 208 may receive the transmitted packets and process the received packets to compute its location relative to the one or more localization devices 212, 213, 214. The wireless communication device 208 may comprise a memory and a processor. Computer-executable instructions, software, or code may be stored in a memory of the wireless communication device 208. The processor may be used to execute the instructions, software, or code. When executed, the computer-executable instructions, software, or code, may perform the processing of the one or more received BLE packets. The processing may comprise computing the location of the wireless communication device 208 relative to the one or more localization devices 212, 213, 214.

In a one embodiment, the processing performed by the processor in the wireless communication device 208 may also utilize other data inputs to provide better granularity and accuracy in determining the position of the wireless communication device 208 within the vehicle 204. For example, GPS (global positioning system) data received by the wireless communication device 208 may be used to supplement the location data derived from the processing of the signals received from the localization devices 212, 213, 214. Furthermore, for example, data provided by cell tower triangulation algorithms may be used to further supplement the location data derived from the processing of the signals received from the localization devices 212, 213, 214.

In one embodiment, the presence of other wireless communication devices (not shown in FIG. 2) provides additional sources for providing location information for the wireless communication device 208. The other wireless communication devices may be located within the vehicle 204. Each of the other wireless communication devices may act as a positional reference to the wireless communication device 208 based on its relative location to the localization devices 212, 213, 214. Thus, each of the other wireless communication devices may be used as a reference to supplement the location data based on the signals received from the localization devices 212, 213, 214.

In one embodiment, movement of the wireless communication device 208 may be tracked using an RFID tracking system. In this embodiment, the localization devices 212, 213, 214, may comprise RFID (radio frequency identification) nodes. An RFID tag may be attached to the mobile communication device 208. The RFID tag may comprise an active or a passive transceiver that transmits a radio signal to the RFID nodes. When the RFID tag is an active device, it may be powered by a small battery. An active RFID tag may periodically transmit the radio signal to the reader while a passive RFID tag transmits a signal in response to a radio signal received from one or more nodes. While the illustration of FIG. 2 shows three locations where RFID nodes may be positioned inside a vehicle, there may be any number of RFID tags attached to the vehicle in other embodiments. The nodes may be positioned inside the vehicle or on the exterior of the vehicle. The one or more RFID nodes may receive the radio signals transmitted by the RFID tag and facilitate the processing of these signals to determine the location of the tag, and hence the location of the mobile communication device 208. The location of the tag may be determined using triangulation, based on the amplitude and direction of the radio signals received at each node. Each node may be communicatively coupled to a RFID processor that processes the received radio signals transmitted by the RFID tag. The RFID processor may determine the location of the tag using a triangulation technique, for example. While not shown in FIG. 2, the RFID processor may be located anywhere in the vehicle. The RFID processor may transmit data regarding the position of the mobile communication device 208 to the one or more servers previously described in connection with FIG. 1. Using the foregoing technique, the movement of the mobile communication device may be monitored by the insurance company.

In other embodiments, the driver's wireless communication device 208 may be tracked using a plurality of other wireless communication devices that are in close proximity to the driver's mobile communication device 208. The plurality of other wireless communication devices may be able to detect the presence of the driver's wireless communication device and determine an associated signal strength and direction. The signal may comprise a Bluetooth or IEEE 802.11xx type of signal, for example. As additional wireless communication devices are used, a mesh network may be implemented, allowing for improved accuracy in the determination of the location of the driver's wireless communication device 208 relative to the other wireless communication devices. The signal strength and direction data obtained from each of the other wireless communication devices may be collected and processed by a server such as the servers 108, 110 described in connection with FIG. 1. Based on this data, triangulation techniques may be employed to determine the location of the driver's wireless communication device 208 relative to the other wireless communication devices. The other wireless communication devices may be located within the driver's vehicle or may be located in another vehicle in the vicinity of the driver's vehicle. The server may be able to distinguish and identify the driver's wireless communication device from the other communication devices based on one or more features, characteristics, and historical data associated with the use of the driver's wireless communications device and/or use of applications (resident on the driver's wireless communication device). The applications may have been previously downloaded by the driver from the one or more servers of the insurance company. The applications may allow the driver to input a driver profile and establish a good driver scorecard.

Referring to FIGS. 1 and 2, the one or more servers 108, 110 may determine the location of the vehicle 204 being driven based on a first location data provided by the wireless communication device 208 and/or a second location data provided by the localization devices 212, 213, 214. The wireless communication device 208 may provide its location information using one or more localization devices 212, 213, 214 and a GPS system (global positioning system). The one or more servers 108, 110 may utilize the first location data and/or second location data to determine the location of the vehicle being driven.

The localization devices 212, 213, 214 may be attached to the vehicle 204 by an owner of the vehicle 204. Furthermore, as a participant in a driver risk behavior program using the driver behavior risk assessment system, an insured may be incentivized to properly place the localization devices in the appropriate places in his vehicle so that data may be properly acquired by the insurance company. For example, if the one or more localization devices are billed to the insured, the insured may be given a rebate for properly positioning the localization devices in his vehicle 204. Otherwise, the insured may direct an automobile dealership or other service facility to install the localization devices for him. It is contemplated that the localization devices may be installed as an option when a vehicle is purchased at a dealership. After installation, the insured may also be given an initial discount on his insurance premium. Future discounts or adjustments to the insured's premium may be based on an ongoing assessment of the driver's risk behavior as determined by the servers 108, 110 of the driver behavior risk assessment system.

Figure 3:
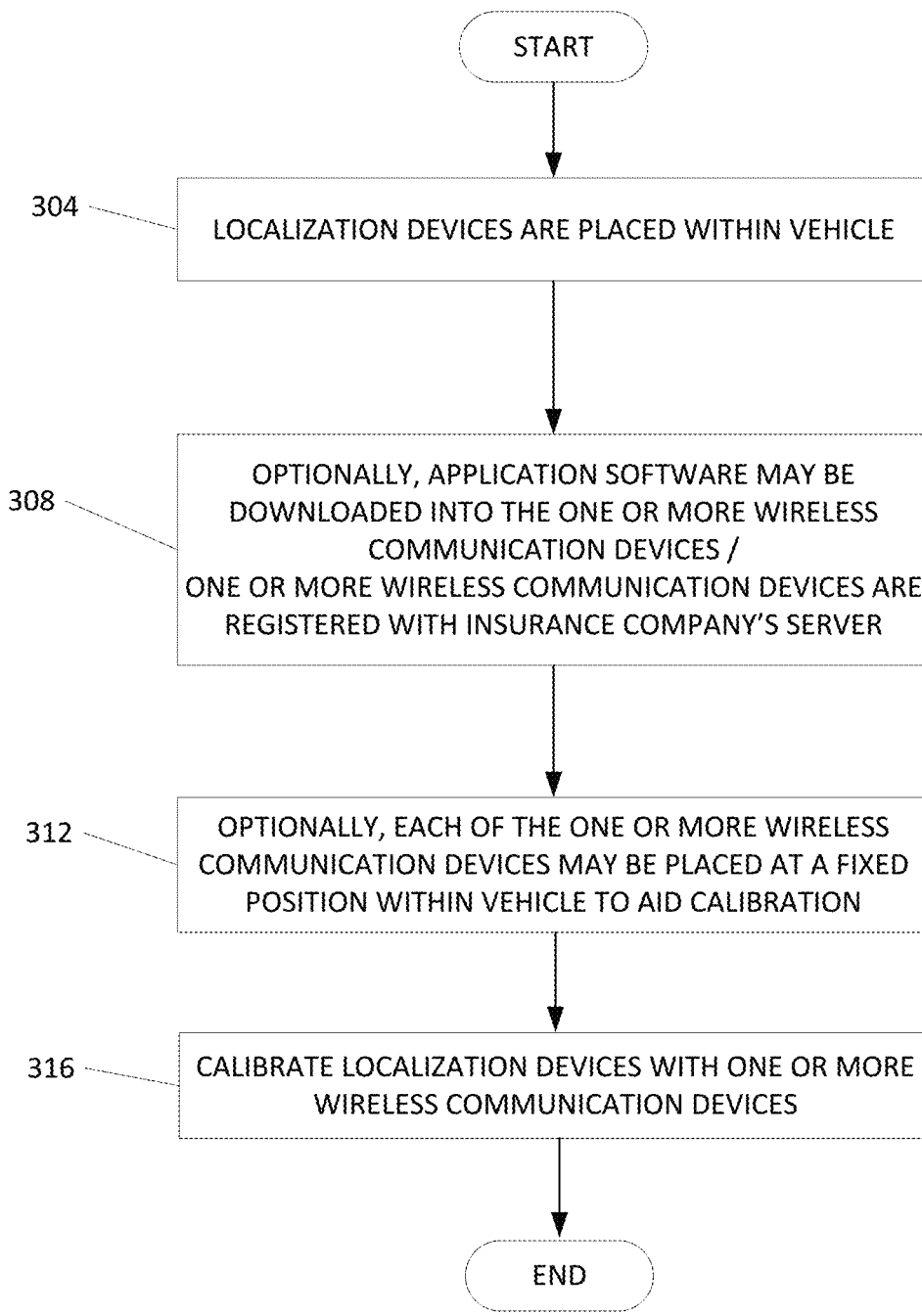
FIG. 3 is an operational flow diagram describing the calibration of the localization devices in a vehicle in accordance with an exemplary embodiment.

FIG. 3 is an operational flow diagram describing the placement and calibration of the localization devices in a vehicle in accordance with an exemplary embodiment. The localization devices were previously described in connection with FIGS. 1 and 2.

At step 304, one or more localization devices may be placed in or around a vehicle. The one or more localization devices may be positioned in locations to maximize a direct line of sight view of a wireless communication device. The one or more localization devices may be positioned symmetrically within the vehicle to equalize the transceiver's sensitivity of signals received by each localization device. Use of two localization devices may facilitate measurement over two axes in a plane. Use of at least three localization devices may facilitate measurement over three axes in space. At least three localization devices may be used to determine the location or position of a wireless communication device in space. When using three localization devices, for example, two localization devices may be placed symmetrically at the top of a windshield while the third localization device may be positioned at the center top location of the rear windshield, as was previously shown in connection with FIG. 2. While the localization devices may be positioned asymmetrically, the vehicle's owner may prefer positioning the localization devices symmetrically for aesthetic reasons. If the localization devices are placed asymmetrically, calibration software resident within the one or more servers or in the one or more wireless communication devices may be executed by one or more processors to determine whether the localization devices have been appropriately placed to allow detection of a wireless communication device placed within the vehicle.

Optionally, at step 308, application software may be downloaded into the one or more wireless communication devices. The application software may allow a participant of the driver risk behavior program to register his cell phone with the insurance company's server. Furthermore, data identifying each of the one or more wireless communication devices may be communicated to the insurance company's server. A user, such as an insured, may associate each of the one or more communication devices to each of one or more vehicles.

Optionally, at step 312, each of the one or more localization devices may be placed at fixed positions within the vehicle as an aid to the calibration of the localization devices. For example, each of the localization devices may be positioned at corners of the roofline of the vehicle as a way to expedite the calibration procedure.

At step 316, initialization software may be executed by a processor of a server or a processor resident within a wireless communication device. The owner of the vehicle may initiate the calibration procedure by way of an input selection on one of the one or more wireless communication devices. For example, the owner may depress a keypad button that initiates the calibration procedure. The calibration procedure may include pairing each of the wireless communication devices to each of the localization devices by way of signals transmitted from each wireless communication device to each localization device. The owner may initiate calibration of the one or more localization devices based on an initialization procedure. The owner may initiate the calibration procedure using his wireless communication device while he is in his normal seating position in the vehicle. The localization devices may infer a range of locations where a wireless communication device may be found in the interior of the vehicle when the vehicle is being driven.

While the operational flow diagram illustrated in FIG. 3 presents a representative embodiment of a process of the invention, the sequence of the steps illustrated in FIG. 3 may be changed in accordance with the various aspects of the invention. For example step 308 may be performed before step 304 and step 312 may be performed before either step 304 or step 308.

Figure 4:
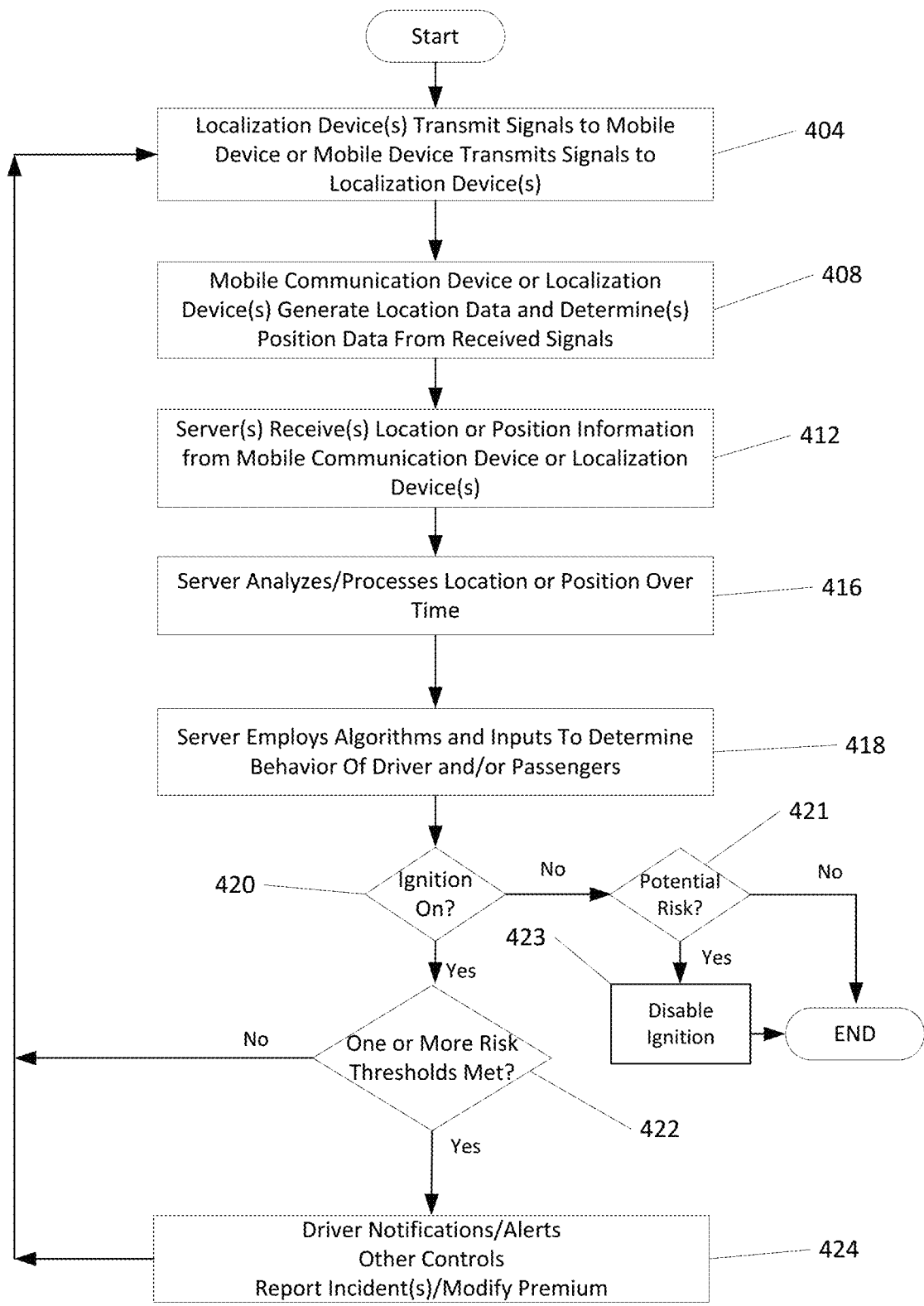
FIG. 4 is an operational flow diagram describing how movements of the driver's mobile communication device are processed in accordance with an exemplary embodiment.

FIG. 4 is an operational flow diagram describing how movements of the driver's wireless communication device are processed in accordance with an exemplary embodiment.

The process starts at step 404 where one or more localization devices may be configured to transmit one or more signals to a driver's wireless communication device. Alternatively, the driver's wireless communication device may be configured to transmit one or more signals to the one or more localization devices. The one or more signals may comprise Bluetooth Low Energy (BLE) packets, for example. The BLE packets may be transmitted either from the one or more localization devices or from the driver's wireless communication device at regular intervals using a transmission antenna. The antenna for each of the one or more localization devices may comprise a switched antenna array. In an illustrative embodiment, the BLE packets may be received by the driver's wireless communication device, and the angle of departure of the BLE packets may be calculated by the driver's wireless communication device. The angle of departures of the one or more BLE packets transmitted by the switched antenna arrays of the one or more localization devices may be used to determine the location of the driver's wireless communication device relative to the one or more localization devices. In another illustrative embodiment, the driver's wireless communication device transmits one or more BLE packets to the switched antenna array and the angle of arrival of each of the BLE packets may be calculated by each of the switched antenna arrays.

At step 408, the location of the driver's wireless communication device relative to the one or more localization devices may be determined using the angle of departure of each of the BLE packets received. In this illustrative embodiment, the driver's wireless communication device may compute the angle of departure for each BLE packet that it receives. Based on the one or more angles of departure, the driver's wireless communication device may generate location data to determine its location relative to the one or more localization devices. In another illustrative embodiment, each of the one or more localization devices computes an angle of arrival for each of the BLE packets. The one or more localization devices utilize these angles of arrival to generate the location of the driver's wireless communication device. The location data is used to determine the location or position of the driver's wireless communication device relative to the one or more localization devices.

Next, at step 412, the location or position may be transmitted to one or more servers and/or computing devices for storage (e.g., in a memory) and processing (e.g., by a processor). The location or position data or information may be transmitted by the driver's wireless communication device or the one or more localization devices situated within the vehicle.

At step 416, the one or more servers may analyze and/or process the location or position information of the wireless communication device over time.

Next, at step 418, the one or more servers may use or employ one or more algorithms to determine the behavior of the driver of the vehicle over time. For example, the risk behavior of the driver may be inferred or determined based on applying an algorithm using the movements of the driver's wireless communication device. It is contemplated that movement of the phone in certain ways may signify unsafe behavior. Therefore, the one or more servers may analyze the position of the driver's wireless communication device over time using one or more algorithms. A person having ordinary skill in the art after review of the entirety disclosed herein will appreciate that numerous deterministic, algorithmic, formulaic and/or stochastic approaches are contemplated by the reference to "algorithm" herein. In addition, machine learning, prediction, and/or statistical clustering methods may also be employed by the algorithm in some embodiments.

In a representative embodiment, an algorithm is used to determine the type of behavior performed by a driver based on where the driver's wireless communication device (or handset) is located relative to the attached localization devices. One or more locations and/or positions of the handset may correspond to a particular event. Thus, an event may be associated with a range of handset positions. Thus, the algorithm may map a particular range of handset positions to a particular event. The probability of one or more events occurring over a large period of time may be determined by the algorithm. As the driver drives his vehicle over a period of time, the one or more events accumulate and the percentage of occurrence for each event may be tabulated. Thus, over a large enough sample set, the probability of the occurrence of one or more events will be determined or predicted. Thus, the insurance company will be able to establish a risk profile based on the driver's behavioral history. The behavioral history may be specific to just the data collected from the driver, or may generally include data collected from other drivers (e.g., all drivers with the same vehicle type, all drivers of a particular demographic, etc.) that meet a particular criteria.

The algorithm may collect data associated with variations in the z axis of a three dimensional xyz coordinate system. After a significant number of samples are collected over time, a histogram of data points along the z axis may be generated to allow one to categorize a range of one or more ranges of points along the z axis as representing a particular type of behavioral event. For example, a handset positioned at $z=0$ may correspond to a first event in which the handset located at safe position (i.e., a low height such as in the center console of the vehicle or inside the pant pocket of the driver). A handset positioned at $z=\frac{1}{2}$ may correspond to a second event in which the handset is located at a height suitable for the driver to text or for view the screen of the handset. Occurrence of the second event may be considered an unsafe condition by the insurance company. A handset positioned at $z=1$ may correspond to a third event in which the handset is located at a height that is suitable for the driver to talk with the handset next to his ear. The height at $z=1$ may correspond to the height or level of the driver's head while the driver is seated in his vehicle. Occurrence of the third event may also be considered an unsafe condition by the insurance company.

The algorithm may determine that an event corresponding to the handset positioned at $z=0$ has occurred if the handset is below $z=\frac{1}{4}$, for example. The algorithm may determine that the event corresponding to $z=\frac{1}{2}$ has occurred if the handset has been between $z-\frac{1}{4}$ and $z=\frac{3}{4}$ for a certain minimum duration of time (i.e., a minimum threshold value). Likewise, the algorithm may determine that the event corresponding to $z=1$ has occurred if the handset has been between $z-\frac{3}{4}$ and $z=5/4$ for a certain minimum duration of time.

The algorithm may determine the average durations of time corresponding to a $z=\frac{1}{2}$ event and a $z=1$ event. When, for a particular event, the handset is deemed to have occurred for half the average duration of time, the algorithm may determine that the event had occurred with 50% certainty. When, for a particular event, the handset is deemed to have occurred for exactly the average duration of time, the algorithm may determine that the event had occurred with 100% certainty. The probability of an event occurring may be computed by dividing the duration of an event by the average duration of that event.

In one embodiment, the occurrence of an event may be multiplied by its certainty and the probability of occurrence of an event may be computed. For example, the algorithm may compute the probability of occurrence of a $z=\frac{1}{2}$ event (a driver texting or viewing his/her handset). Likewise, the algorithm may compute the probability of occurrence of the $z=1$ event (a driver talking with handset to his/her ear).

Based on the event outcome over time, the percentages or probabilities for each of the $z=0$, $z=\frac{1}{2}$, and $z=1$ event categories may be computed, and the algorithm may assign the driver into a particular risk profile based on these probabilities or event percentages. A driver may be classified as a "good driver" when the $z=0$ event occurs 100% of the time (e.g., the driver leaves his handset on the center console of his vehicle 100% of the time). On the other hand, the driver may be classified as a "bad driver" when $z=\frac{1}{2}$ or $z=1$ events occur for a significant amount of time (e.g., the driver texts or speaks for a significant amount of time, such as texting for 5% of the time and speaking for 10% of the time). In one example, the algorithm may determine a corresponding risk profile based on the following event percentages:

| Risk | Event Percentages |
| --- | --- |
| Good | $z = 0$, 100%; $z = 1/2$, 0%, $z = 1$, 0% |
| Bad | $z = 0$, 85%; $z = 1/2$, 5%, $z = 1$, 10% |
| Bad | $z = 0$, 80%; $z = 1/2$, 0%, $z = 1$, 20% |
| Bad | $z = 0$, 80%; $z = 1/2$, 20%, $z = 1$, 0% |

The foregoing table indicates that a driver is considered a "good" risk if he always has his handset on his center console or in his pant pocket while driving in his vehicle. If the driver has his phone on his console for 85% of the time, texts or surfs the Internet for 5% of the time, and talks with his phone placed on his ear for 10% of the time, then the driver is considered to be a "bad" risk. If the driver has his phone on his console for 80% of the time and talks with his phone placed on his ear for 20% of the time, then the driver is considered to be a "bad" risk. If the driver has his phone on his console for 80% of the time and talks with his phone placed on his ear for 20% of the time, then the driver is considered to be a "bad" risk.

A driver may be categorized into one or more risk categories based on one or more probabilities of occurrence of one or more behavioral risk events. The foregoing exemplary table describes two risk categories, "good" and "bad". In other embodiments, a driver may be assigned to one of a plurality of risk categories.

In addition to the foregoing embodiment, similar methods may be applied to the x and/or y axes where handset positions along these axes may be associated with one or more types of events. The percentage of occurrence of events along these axes may also have an influence in determining a particular driver risk profile.

The algorithm may be used to trigger specific alerts to a driver to modify their behavior. For example, the algorithm may be used to monitor speed while the driver is speaking on the handset. When the speed exceeds a certain velocity while the driver is perceived to be talking on the handset, an alert may be transmitted to the handset from the server.

When the expected percentage of events associated with handset position of a driver changes unexpectedly, the algorithm may determine that an impairment or medical emergency may have occurred. For example, erratic changes in handset position over time may indicate that the driver is involved in a struggle with a car jacker. Furthermore, for example, excessive shaking related to alcoholism may be detected when there are constant small changes in handset position over time. Other types of events may be determined or learned through machine learning and/or prediction methods employed by the algorithm.

The insurer may provide insurance premium discounts to an insured based on the absence of risk related events over a specific period. For example, the insured may receive a discount if a negative event does not occur over a month or if there are less than a certain number of negative events per month.

A sudden acceleration of the wireless communication device may also be interpreted as a type of risk behavior. The algorithm may detect an accelerated movement of the wireless communication device or handset over time. When the acceleration computed by the server exceeds a certain threshold, the one or more servers may determine that a certain risk behavior has occurred. The particular risk behavior may be determined based the acceleration with other data, such as telematics data received using other devices. Movement of the wireless communication device away from the driver's seat region may also be determined by the one or more servers as a particular risk behavior. The server may determine that the wireless communication device is on the floor of the vehicle. The server may interpret this condition to be a risk behavior. Thus, the location of the wireless communication device may be used by the server to determine whether a risk behavior has occurred.

The circumstances during which a driver uses his handset may determine whether or not the driver exhibits risk behavior. For example, the server may determine that the driver uses his handset only when the vehicle is stopped. In this instance, the talking event may be disregarded and not considered a behavioral risk event. The time of day in which the handset is used may also be a factor which determines whether the driver has engaged in risky behavior. For example, texting at night may be considered far more risky that texting during the daytime. Furthermore, for example, texting during rush hour traffic times may be considered far more risky than texting during non-rush hour traffic times. One or more events, such as sustained talking (either by handset to ear or by speakerphone), texting, Bluetooth use, e-mailing, Internet surfing and/or reading, e-book reading, movie watching, use of handset camera and/or video camera, switching of settings and/or application software, playing of games, checking of e-mails, voicemails, text messages, and the like, and positioning of the handset for immediate use (on the driver's lap, for example) may each be indicative of risky behavior and the occurrence of one or more of these events in sequence or in combination may be determined to be a behavioral risk event. In some aspects, a handset may recognize that the driver's face is staring at the handset by way of using a facial recognition algorithm. When the handset determines that the driver is staring at the handset (instead of paying attention to traffic), the algorithm may determine that a behavioral risk event has occurred. The duration of a behavioral risk event may also affect the degree of risk behavior. For example, a driver who typically types short text messages may be associated with less risky behavior than a driver who typically types long text messages. The number and/or duration of behavioral risk events or occurrences over a period of time may affect a driver's risk score. For example, a driver who sends 1 text messages per day while driving would exhibit less risky behavior than a driver who sends 10 text messages per hour.

The localization devices may be capable of receiving RF signals from any communication device within the vehicle. Accordingly, when the localization devices detect the use of multiple devices in the vehicle, the server may determine that a risk behavior has occurred. The movement of the wireless communication device may be monitored over time. When the movement is inconsistent with that of a normal phone conversation, for example, the server may determine that a risk behavior has occurred. The location of the wireless communication device may also determine that the driver is texting while driving. When the server determines that the wireless communication device is in a location within the vehicle that allows the driver to text, read, or dial out using his communication device while the vehicle is determined to be moving, the server may determine that a risk behavior has occurred.

When a risk behavior has determined to have occurred, the one or more servers may generate one or more alerts or notifications to the driver to warn him of the occurrence. The warnings may comprise automated phone calls to the driver's wireless communication device, for example. If the driver replies back on the automated call with an appropriate response and/or the occurrence or condition is discontinued within a period of time, the risk behavior status may be cancelled and/or the occurrence may be considered a normal driving behavior. Otherwise, the warning may continue to alert the driver and written notifications may be generated and communicated to the driver's wireless communication device. Based on the number and types of risk behaviors occurring over a period of time, as determined by the one or more servers, the insurance company may document such occurrences and raise the premium of the driver accordingly.

The behavior of one or more passengers situated in the vehicle may also be analyzed by the one or more servers based on the movements of the driver's wireless communication device. While the driver is driving, the execution of an application resident in a wireless communication device may provide risk behavior information. The driver may execute the application in order to participate in one or more discounts offered by the insurance company. The insurance company may provide the application for download into the wireless communication device as an incentive for the driver to become more conscientious while driving. For example, texting or surfing the Internet while driving may pose a risk hazard. Inputs such as vehicle speed, acceleration, braking information, mileage per trip, duration of trip, and time of day the vehicle is driven, and other telematics data may be used by the one or more algorithms to measure risk behavior of the driver. When the one or more servers determine that potentially unsafe behavior is occurring in a vehicle, that determination may be used to prompt and/or alert other drivers in other vehicles in the same vicinity to be extra careful. Alerts and/or warnings may be transmitted to various other drivers' wireless communication devices in the immediate vicinity when such an unsafe condition is determined by the one or more servers. The one or more servers may be used to monitor the use of the driver's wireless communication device when the vehicle is in operation or when the vehicle is moving. As an incentive, an insurance company may provide a discount to any driver who agrees not to use his wireless communications device in his vehicle. The one or more servers may continuously or randomly monitor the movement of the driver's communication device to determine if the driver is using his wireless communications device or not. In an illustrative embodiment, inputs such as temperature of the vehicle may be received from the driver's vehicle. Based on such inputs, an insurer may be able to better assess the risk of an insured. These inputs may supplement the position or location information of the driver's wireless communication device.

Next, at step 420, an input that indicates whether the vehicle's ignition is turned on may be received by the one or more servers. If it is determined that the vehicle's ignition is turned off, the process continues with step 421, in which the behavior of the driver may be assessed based on the movement of the driver's wireless communication device while the ignition is off. Otherwise, the process continues with step 422. The movement of the driver's wireless communication device may be monitored starting from the time the driver enters his vehicle, and/or closes the door of his vehicle. In some aspects, the movement of the driver's wireless communication device may be monitored if the driver is within a certain distance of his vehicle.

At step 421, the algorithm determines if there is a potential risk associated with the movement of the driver's wireless communication device while the engine is off. This risk may be determined based on erratic movement of the driver's wireless communication device indicative of driving risks, such as intoxicated behavior movement or potential seizure movement. If the movement of the wireless communication device indicates that a potential risk behavior may occur when the driver operates his vehicle, the process may proceed to step 423. Otherwise, the process ends, as it may be determined that the driver poses no safety risk and may be simply sitting in a parking lot with the ignition turned off waiting for someone to arrive, safely speaking or texting to someone on his wireless communication device away from traffic, or operating an application using his wireless communication device.

At step 423, the ignition of the vehicle may be disabled for a period of time. The ignition may be disabled for a period of time even after the movement (associated with the potential risk) of the wireless communication device stops. The period of time may be determined based on the type of potential risk behavior, as determined by the algorithm at the one or more servers. In some aspects, an alert may be transmitted from the one or more servers to the driver's wireless communication device. The alert may be accompanied by a request to respond if the ignition is to be enabled. If the driver appropriately responds to the request, the ignition may be enabled and the process ends. In some aspects, the ignition may not be enabled until the appropriate response is received by the one or more servers.

At step 422, the server determines if one or more risk thresholds have been met using the one or more algorithms. For example, movement of the driver's wireless communication device may be monitored by the localization devices. The orientation of the communication device as well as type of usage may be monitored. Furthermore, telematics data may be used to determine if one or more thresholds have been met or exceeded. For example, a vehicle's speed may exceed a particular threshold if the driver drives his vehicle over a certain number of miles per hour. Thus, the velocity of the vehicle may be monitored to determine if it exceeds a certain threshold value. Furthermore, for example, sudden braking of a vehicle may cause deceleration to occur. The deceleration may be monitored to determine when it exceeds a certain threshold value. Likewise, acceleration may be monitored as well. When the driver makes his vehicle accelerate at more than a predetermined threshold value, the acceleration data may be recorded at the vehicle and transmitted to a computing device or server of an insurance company. Other factors and/or inputs may be monitored and may be used in combination with the telematics data previously mentioned. Temperature within the vehicle may also be used as an input. The temperature may also be transmitted back to the insurance company and stored in a computing device or server.

Next, the process continues with step 424 if one or more risk thresholds have been met and/or exceeded. The number of instances in which a threshold has been reached or exceeded may be recorded by the computing devices and/or servers of the insurance company. The computing devices and/or servers may generate a level of risk associated with the behavior. Otherwise, the process reverts back to step 404. At step 424, the driver may be notified or alerted when a threshold has been met or exceeded. The vehicle may be controlled when a threshold has been met or exceeded. The number of such occurrences may be stored in the insurance company's server. The data may be used to modify the premium of the driver. For example, if the number of these occurrences reaches a certain number, the driver's premium may be adjusted upwards. The computing devices and/or servers may generate reports of such occurrences to the driver to alert or notify the driver that such risk behavior has occurred. The computing devices and/or servers may also provide warnings before the driver's premium raised. Thereafter, the process repeats itself by reverting back to step 404.

A user of a wireless communication device may periodically assess his behavioral performance by way of using application software resident in his wireless communication device. For example, a user may be able to access a driver's scorecard reporting his use of the phone while driving a vehicle. The scorecard may rate a driver based on his use of a wireless communication device. The software application may also provide a graphical user interface that informs the driver that he performed one or more risky behaviors over a certain period of time. For example, the driver may have texted while driving, surfed one or more websites, or used one or more applications resident within a smartphone. The software application may also be used to monitor the types of applications the user was accessing while driving. For example, the software application may monitor that the user was shopping at a certain website, playing a card game, or inputting text in an application, for example. The software may report this data back to the insurance company's server where the scorecard may be computed. The scorecard may also provide a daily score and an overall score for the time period. The scorecard may provide a measure of a driver's behavior as a function of which wireless communication device was used. This may provide an indication of which driver was responsible for a certain behavior over the period of time.

The scorecard may be used to re-evaluate and adjust the premium for the insured. Based on the scores for each behavioral risk, a resulting score may be accessed and displayed to a user of a wireless communication device. The ability to access the overall score and monitor his prospective insurance premium discount may act as an incentive to an insured to modify his behavior while driving. The foregoing presents a simplified summary of the disclosure in order to provide a basic understanding of some aspects. It is not intended to identify key or critical elements of the invention or to delineate the scope of the invention. Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a tangible computer-readable medium (e.g., a CD-ROM, RAM, hard drive, flash memory, etc.) storing instructions to cause a processor to perform methods in accordance with aspects of the disclosure is contemplated.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

While some embodiments have been described with respect to specific examples, other embodiments include numerous variations and permutations of the above described systems and techniques.

We claim:
1. A method comprising:
processing, by at least three localization devices attached to a first vehicle, a signal transmitted over time by a wireless communication device;
determining, based on the processing, that a location, of the wireless communication device relative to the at least three localization devices, corresponds to a height of a driver in a seated position in the first vehicle;
determining, by a computing device and based on the location of the wireless communication device, one or more occurrences of one or more events associated with the driver of the first vehicle;
determining, by the computing device, one or more probabilities of occurrence of the one or more occurrences of the one or more events, and
determining, based on the one or more probabilities, that an event of the one or more events corresponds to the driver speaking while the wireless communication device is placed on an ear of the driver;
categorizing, by the computing device and based on the event, the driver of the first vehicle into a risk category;
the method further comprising:
prior to the transmitting of the signal by the wireless communication device, calibrating the wireless communication device by pairing each of the at least three localization devices while the wireless communication device is located in a vicinity of a driver seat of the first vehicle;
determining, by the computing device over time and based on the signal transmitted by the wireless com- munication device, a triangulated position of the wireless communication device relative to the at least three localization devices; and determining, by the computing device and based on the triangulated position of the wireless communication device, that the driver is operating the wireless communication device while driving the first vehicle; and transmitting an alert to a second vehicle, wherein the second vehicle is different from the first vehicle.

2. The method of claim 1, wherein insurance premium discounts are provided to the driver of the vehicle when the risk category indicates that the driver is associated with a good risk.

3. The method of claim 1, wherein the wireless communication device comprises an active RFID tag.

4. The method of claim 3, wherein the active RFID tag is powered by a battery.

5. The method of claim 1, wherein an insurance premium of the driver is increased when the risk category indicates that the driver is associated with a high risk.

6. The method of claim 1, wherein the signal comprises a Bluetooth Low Energy (BLE) signal.

7. The method of claim 1, wherein the at least three localization devices comprise four localization devices that are symmetrically attached to the vehicle.

8. An apparatus comprising:
at least three localization devices attached to the first vehicle, wherein each localization device comprises a RFID node;
a wireless communication device transmitting a signal that is received by each of the at least three localization devices, wherein prior to the transmitting, the wireless communication device has been calibrated by pairing each localization device to the wireless communication device while the wireless communication device is located in a vicinity of a driver seat of the first vehicle;
a computer processor; and
a tangible computer memory storing computer-executable instructions that, when executed by the computer processor, cause the apparatus to perform steps comprising:
processing, by the computer processor, the signal transmitted by the wireless communication device;
determining, by the computer processor over time and based on the signal transmitted by the wireless communication device, a triangulated position of the wireless communication device relative to the at least three localization devices;
determining, by the computer processor and based on the triangulated position of the wireless communication device, that the driver is operating the wireless communication device while driving the first vehicle; and
transmitting an alert to a second vehicle, wherein the second vehicle is different from the first vehicle.

9. The apparatus of claim 8 wherein the triangulated position corresponds to a height of the driver in a seated position in the vehicle and an event of one or more events corresponds to the driver speaking while the wireless communication device is placed on an ear of the driver, wherein the tangible computer memory further stores computer-executable instructions that, when executed by the computer processor, cause the apparatus to perform steps comprising:

determining, by the computer processor and by using an algorithm, one or more occurrences of the one or more events based on the triangulated position;

determining, by the computer processor and by using the algorithm, one or more probabilities of occurrence of the one or more occurrences of the one or more events, and based on the one or more probabilities, categorizing, by the computer processor, the driver into a risk category.

10. The apparatus of claim 9 wherein insurance premium discounts are provided to an insured of the vehicle if the risk category indicates that the driver is associated with a low risk.

11. The apparatus of claim 8 wherein alerts are transmitted to the wireless communication device if the triangulated position changes irregularly over time, and wherein the wireless communication device comprises an active RFID tag powered by a battery.

12. The apparatus of claim 9 wherein an insurance premium of an insured is increased if the risk category indicates that the driver is associated with a high risk.

13. The apparatus of claim 8 wherein the signal comprises a Bluetooth Low Energy (BLE) signal.

14. The apparatus of claim 8 wherein the at least three localization devices comprises four localization devices that are symmetrically attached to the vehicle.

15. A system comprising:
at least one memory; and
at least one processor coupled to the at least one memory and configured to perform, based on instructions stored in the at least one memory:
periodically receiving a signal transmitted over time by a wireless communication device in a vehicle, wherein the signal is indicative of a location of the wireless communication device relative to at least three localization devices attached to the vehicle;
analyzing the received signal to determine one or more occurrences of one or more events associated with a driver of the vehicle;
determining, by using an algorithm and based on the location of the wireless communication device, one or more probabilities of the one or more occurrences of the one or more events; and
based on the one or more probabilities, categorizing the driver of the vehicle into a risk category.

16. The system of claim 15 wherein an insurance premium of an insured is increased if the risk category indicates that the driver is associated with a high risk.

17. The system of claim 15 wherein the signal comprises a Bluetooth Low Energy (BLE) signal.

18. The system of claim 15, wherein insurance premium discounts are provided to the driver of the vehicle when the risk category indicates that the driver is associated with a low risk.

19. The system of claim 15, wherein the wireless communication device comprises an active RFID tag powered by a battery.

20. The system of claim 15, wherein the location corresponds to a height of the driver in a seated position in the vehicle, and an event of the one or more events corresponds to the driver speaking while the wireless communication device is placed on an ear of the driver.

* * * * *